United States Patent
Jansson

Patent Number: 5,816,735
Date of Patent: Oct. 6, 1998

[54] FEMALE PART THAT CAN BE LOCKED IN SELECTIVE POSITIONS ON A ROUND ROD

[75] Inventor: Torgny Jansson, Lindesberg, Sweden

[73] Assignee: Tormek AB, Lindesberg, Sweden

[21] Appl. No.: 966,593

[22] Filed: Nov. 10, 1997

Related U.S. Application Data

[63] Continuation of Ser. No. 592,358, Jan. 16, 1996, abandoned.

[30] Foreign Application Priority Data

Jul. 16, 1993 [SE] Sweden .................................. 93024420

[51] Int. Cl.$^6$ .................................. F16B 2/02; F16B 7/04
[52] U.S. Cl. .............................................. 403/362; 403/16
[58] Field of Search ............................... 403/362, 16, 382

[56] References Cited

U.S. PATENT DOCUMENTS

| | | | |
|---|---|---|---|
| 1,118,684 | 11/1914 | Ross | 403/362 X |
| 1,171,569 | 2/1916 | Lampert | 403/362 X |
| 2,505,215 | 4/1950 | Siegerist | 403/16 |
| 3,030,131 | 4/1962 | Scherry | 403/362 |
| 3,730,569 | 5/1973 | Feinler | 403/362 |
| 4,435,103 | 3/1984 | Becker et al. | 403/362 X |

FOREIGN PATENT DOCUMENTS 584116  12/1977  U.S.S.R. .................................. 403/362

Primary Examiner—Anthony Knight
Attorney, Agent, or Firm—John Lezdey and Assoc.

[57] ABSTRACT

The present invention teaches a female part that can locked in selected positions on a round rod. The female part includes a hollow passageway into which a locking screw can be screwed in a generally radial direction into engagement with the rod. When seen in a cross section, the passageway includes two flat surfaces which slope towards one another symmetrically in relation to a diametrical plane. The angle defined by the surfaces with the plane lies between 2.5' and 15.0'. The locking screw enters the passageway in the wider part between the surfaces.

5 Claims, 2 Drawing Sheets

FEMALE PART THAT CAN BE LOCKED IN SELECTIVE POSITIONS ON A ROUND ROD

This is a continuation of application Ser. No. 08/592,358, filed continuation Jan. 16, 1996, now abandoned.

BACKGROUND OF THE INVENTION

1. Field of the Invention

The present invention relates to a female part which embraces a round rod and can be locked in selected positions relative thereto. The female part is provided with a locking screw which can be screwed in a generally radial direction in relation to the hollow passageway of the female part and therewith be brought into engagement with the round rod.

2. Description of the Prior Art

There is a need in many instances to lock an object to a round rod or to lock a round rod to a fixed object against movement in an axial direction and against rotational movement. Examples of such machine elements include the grinding supports used in grinding machines, lamps fitted to scenic lighting systems for instance, music stands, bed reading tables, stands for orchestral percussion instruments, walking frames and roller-supported walking frames, mechanisms for adjusting the height of chairs, stools, workbenches, etc., devices for adjusting the position of rearview mirrors in caravans, camera stands, etc. All of these cases include in common a round hollow passage in one part and a coacting round rod or axle in the other part. Several solutions are known for locking these parts together, of which the most common solution involves the use of a screw threaded hole which extends in towards the centre of the hollow passageway and into which a knob-provided screw can be screwed into abutment with the round rod. The tightening force required to lock said parts together varies widely. The locking effect achieved with this solution, however, is insufficient to withstand large torsional forces. The screw can be given a sharp point or be made annular, in order to lock the parts more positively relative to one another against twisting and axial movement. This solution, however, damages the rod, while the point or the annular edge at the end of the screw becomes worn and loses its intended locking effect. Other solutions involve providing the axle or rod with holes or recesses in which a screw or cotter engages. This solution, however, results in fixed positions of the parts in relation to each other, and also makes manufacture more expensive. The axle may also be ground flat over a given part thereof, with the screw acting against the flat surfaces thus provided. The other solutions include providing the axle with grooves, which also means in this case that fixed positions are solely obtained in a rotational or twisting direction. The female part may also be slotted, so as to enable it to be clamped around the round rod with the aid of a screw. A considerable tightening force is required, however, to overcome the resistance of the material from which the female part is made. Other solutions include the use of a chuck, although this solution is not a positive solution and is also relatively expensive. The use of a V-shaped clamp or hasp and other types of simpler clamps and hasps has also been proposed.

In summary, it can be said that there is no solution which fulfills the requirement of a simple device by means of which a strong and durable locking effect can be achieved between a female part and a round rod with the application of a moderate locking force between said parts. The invention as defined in the characterizing clauses of respective following claims provides locking of a female part to a round rod in an effective and simple manner.

SUMMARY OF THE INVENTION

The present invention teaches a female part that can be locked in selected positions on a round rod. The female part includes a hollow passageway having a screw threaded hole. A locking screw is screwed into the threaded hole in an essentially radial direction such as to engage the rod. The passageway includes two mutually opposing flat surfaces which are symmetrically sloped towards one another in relation to a diametrical plane located through the passageway. The female part is configured such that an angle of inclination of about 2.5' to 15.0' lies between the surfaces and the plane. The sloping surfaces narrow the passageway at one end so that the passageway has a narrow end and a wide end. The locking screw enters the passageway at the wide end

BRIEF DESCRIPTION OF THE DRAWINGS

The invention will now be described in more detail with reference to an exemplifying embodiment thereof and also with reference to the accompanying drawings, in which.

DESCRIPTION OF THE PERFERRED EMBODIMENTS

Figures 1, 5:
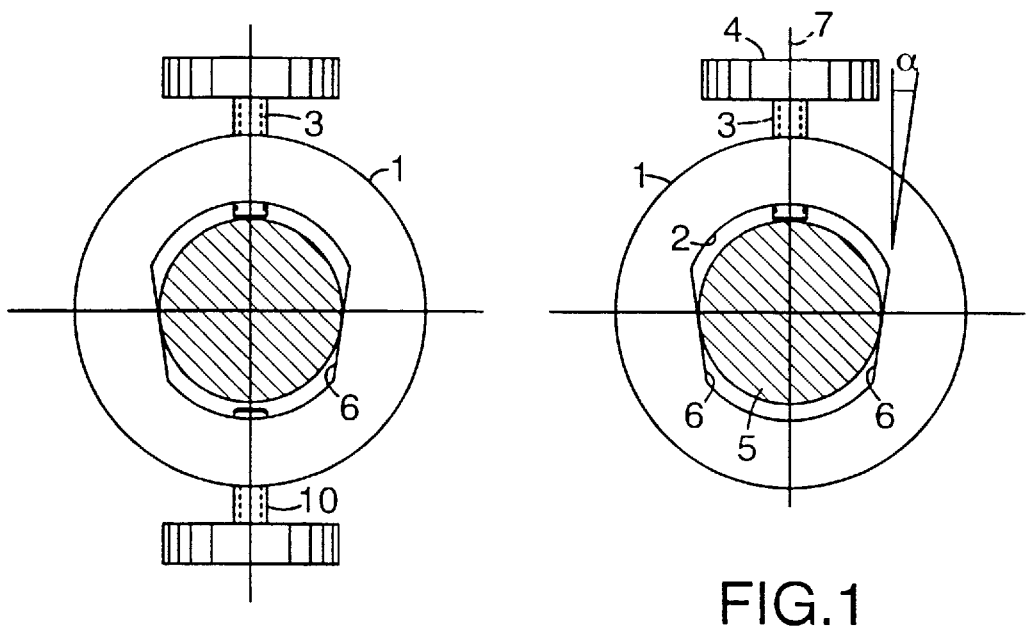
FIG. 1 is a principle schematic illustration of the invention.
FIG. 5 illustrates the inventive female part shown in FIG. 1 supplemented with a backing-off screw.

FIG. 1 illustrates the principle of the present invention and shows a female part 1 in the form of a sleeve having a hollow passageway 2. The female part 1 includes a screw threaded hole which extends generally towards the centre of the passageway 2 and into which a screw 3 can be screwed. The screw 3 is provided with a knob 4 for turning the screw. The reference numeral 5 identifies a round rod onto which the female part can be locked against rotational and axial movement.

As will be seen from the figure, the passageway 2 includes two mutually opposing flat surfaces 6 which are inclined symmetrically relative to one another and therewith to a diametrical symmetry plane 7 through the passageway. The angle of inclination between the symmetry plane 7 and respective flat surfaces 6 is referenced $\alpha$.

When the round rod 5 is inserted in the hollow passageway 2 of the female part 1, the rod is accommodated in the passageway 2 in linear abutment with the flat surfaces 6. When the female part 1 is to be locked to the rod 5, the screw 3 is screwed into engagement with the rod 5 therewith urging the rod between the sloping surfaces 6. The screw 3 enters the passageway in the wider part thereof between the surfaces 6, as shown in FIG. 1.

Figure 2:
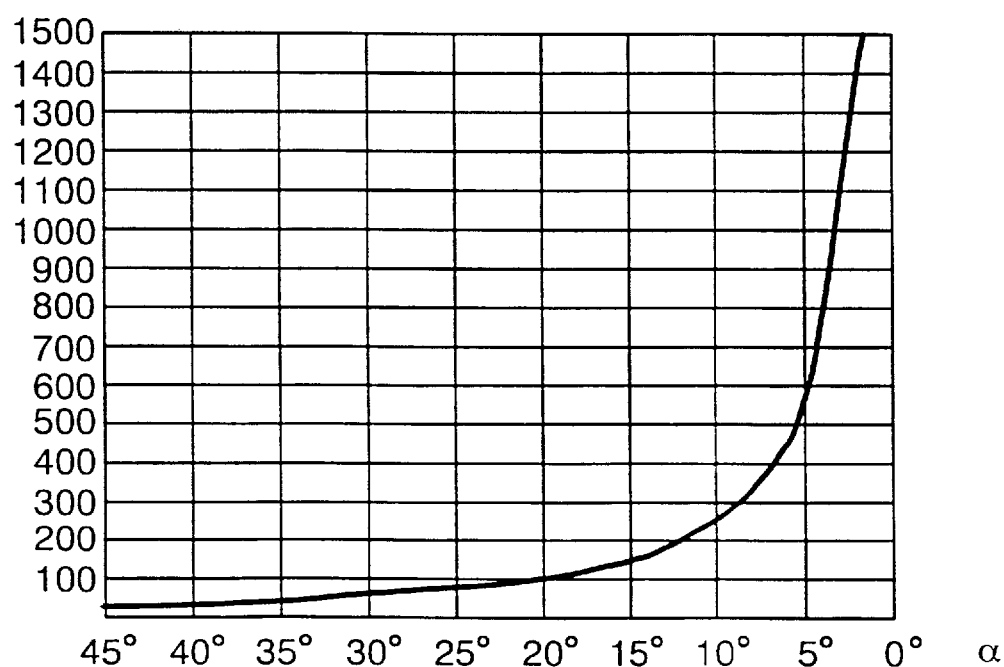
FIG. 2 is a curve which illustrates the increase in locking force in percentage in relation to the angle between the sloping surfaces of the hollow passage.

FIG. 2 shows that the locking force will increase with smaller angles $\alpha$. The increase in locking force is the increase in locking force in relation to conventional locking when using a hollow passageway of circular cross-section and a given tightening force. It will be seen from the curve that the locking force increases drastically at an angle $\alpha$ of between 15° and 3°. As shown in FIG. 2, an angle of inclination between about 2.5° and 15° provides a locking force of about 150 to 1200%. The angle $\alpha$ is chosen in accordance with the tightening force desired in relation to locking force, and is also dependent on the surface hardness and mechanical strength of the material used. The harder the material the smaller the angle α, in other words a critical smallest angle α is found for each material. In order to avoid this locking, it is therefore necessary for a larger angle α to be chosen. When the greatest possible locking force is desired and there is no need to frequently release the locked components, there is chosen an angle which is so small as to lock the components together. To enable these components to be released from one another, there may be provided a backing-off screw 10 which acts in a direction opposite to the screw 3 so as to loosen the round rod 5 from its pressed-in position between the sloping surfaces 6, see FIG. 5.

Figure 3:
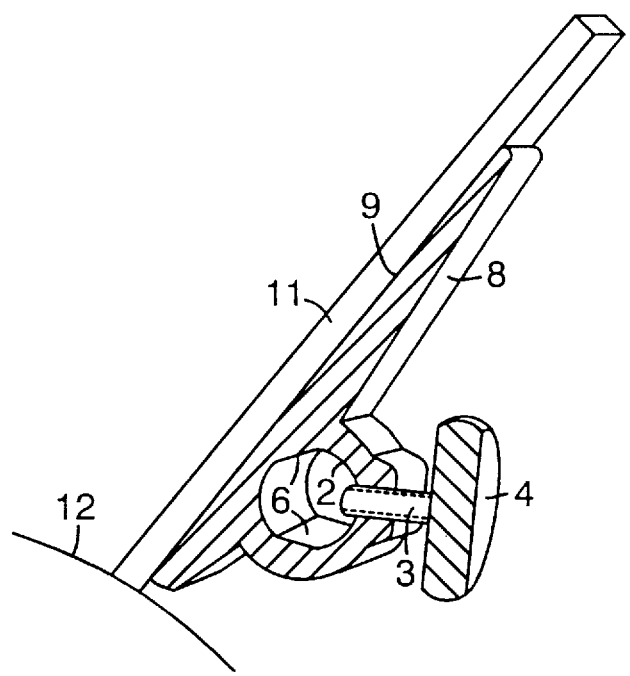
FIG. 3 is a schematic perspective section view of a grinding support for grinding machines, in which the inventive concept is applied.
Figure 4:
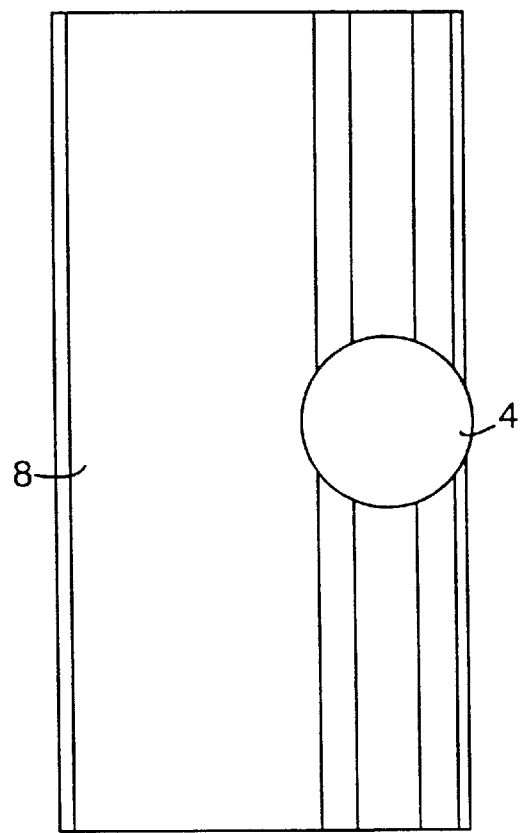
FIG. 4 is a view from above of the grinding support shown in FIG. 3.

FIGS. 3 and 4 illustrate an advantageous practical application of the invention in the form of a grinding support 8 which includes a grinding support plate 9 and which is used in conjunction with grinding machines for tool grinding purposes as shown at 11, for instance. The grinding support 8 is a single-piece extruded aluminium structure having a through-passing hollow passageway 2 which includes the flat, sloping surfaces 6. As in the FIG. 1 illustration, the references 3 and 4 identify respectively a screw and a knob. Particularly with this type of machine element, it is necessary to positively lock the position and inclination of the support plate 9 in relation to the grinding stone, indicated at 12, in order to achieve a proper result. As a result of the present invention, the grinding support can be locked in position effectively by applying a very light tightening force through the knob 4. Because of the relatively large surface abutment between the round rod 5 and the surfaces 6, the components are not subjected to any noticeable wear and the position of the grinding support 8 can be frequently changed without causing any problem.

It will be understood that the support plate 8 in the hollow passageway 2 is supported for axial and rotational movement on a carrier arm in the form of a round rod attached to the grinding machine stand, not shown.

It will also be understood that the female part must be made of a sufficiently rigid material which will not yield when the screw 3 is tightened. It will also be understood that the screw may be of a kind which is turned with the aid of a tool instead of a knob. The term "round rod" shall also be understood to include a tube or pipe.

What is claimed is:

1. A female part that is attached to a grinding machine and can be locked in selected positions on a round rod at a selected locking force, said female part having a passageway, said passageway having a screw threaded hole through which a locking screw is screwed in an essentially radial direction such as to engage said rod, said passageway including two mutually opposing flat surfaces which are symmetrically sloped towards one another in relation to a diametrical plane located through said passageway such that an angle of inclination between each sloping surface and said plane lies between about 2.5° and 15°, and such that said sloping surfaces transform the shape of said passageway to form a narrow part and a wider part thereof, and wherein said locking screw enters said passageway through the wider part and urges the rod between the sloping surfaces whereby an angle of inclination can be selected to provide an increase in locking force of about 150 to 1200%.

2. A female part according to claim 1, said grinding support including a grinding support plate.

3. A female part that is attachable to a support and can be locked in selected positions on a round rod at a selected locking force, said female part having a passageway, said passageway having a screw threaded hole through which a locking screw is screwed in an essentially radial direction such as to engage said rod, said passageway including two mutually opposing flat surfaces which are symmetrically sloped towards one another in relation to a diametrical plane located through said passageway so as to provide an angle of inclination between each sloping surface and said plane can lie between about 2.5° and 15°, and such that said sloping surfaces can transform the shape of said passageway to form a narrow part and a wider part thereof, and wherein said locking screw enters said passageway through the wider part and urges the rod between the sloping surfaces whereby an angle of inclination can be selected to provide an increase in locking force of about 150 to 1200%.

4. The female part of claim 3 wherein said female part is integral with said support.

5. The female part of claim 3 including a release screw which can be screwed into said female part diagonally opposite said locking screw.

* * * * *